No. 823,882. PATENTED JUNE 19, 1906.
C. A. LEWIS.
MECHANICAL TOY.
APPLICATION FILED FEB. 23, 1906.
2 SHEETS—SHEET 1.
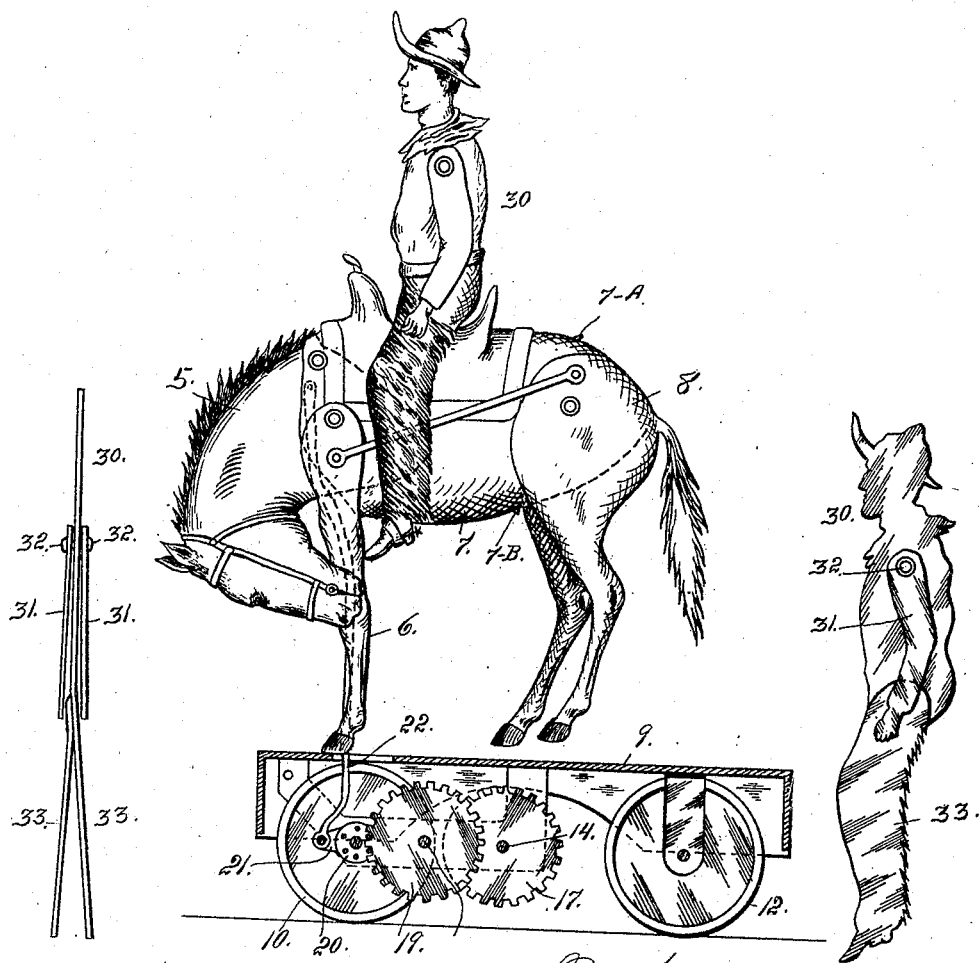
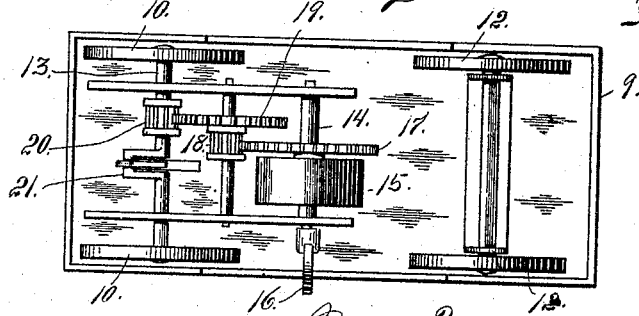
Witnesses
Otto E. Hoddick.
Dena Nelson.
Inventor
Charles A. Lewis.
By
Attorney

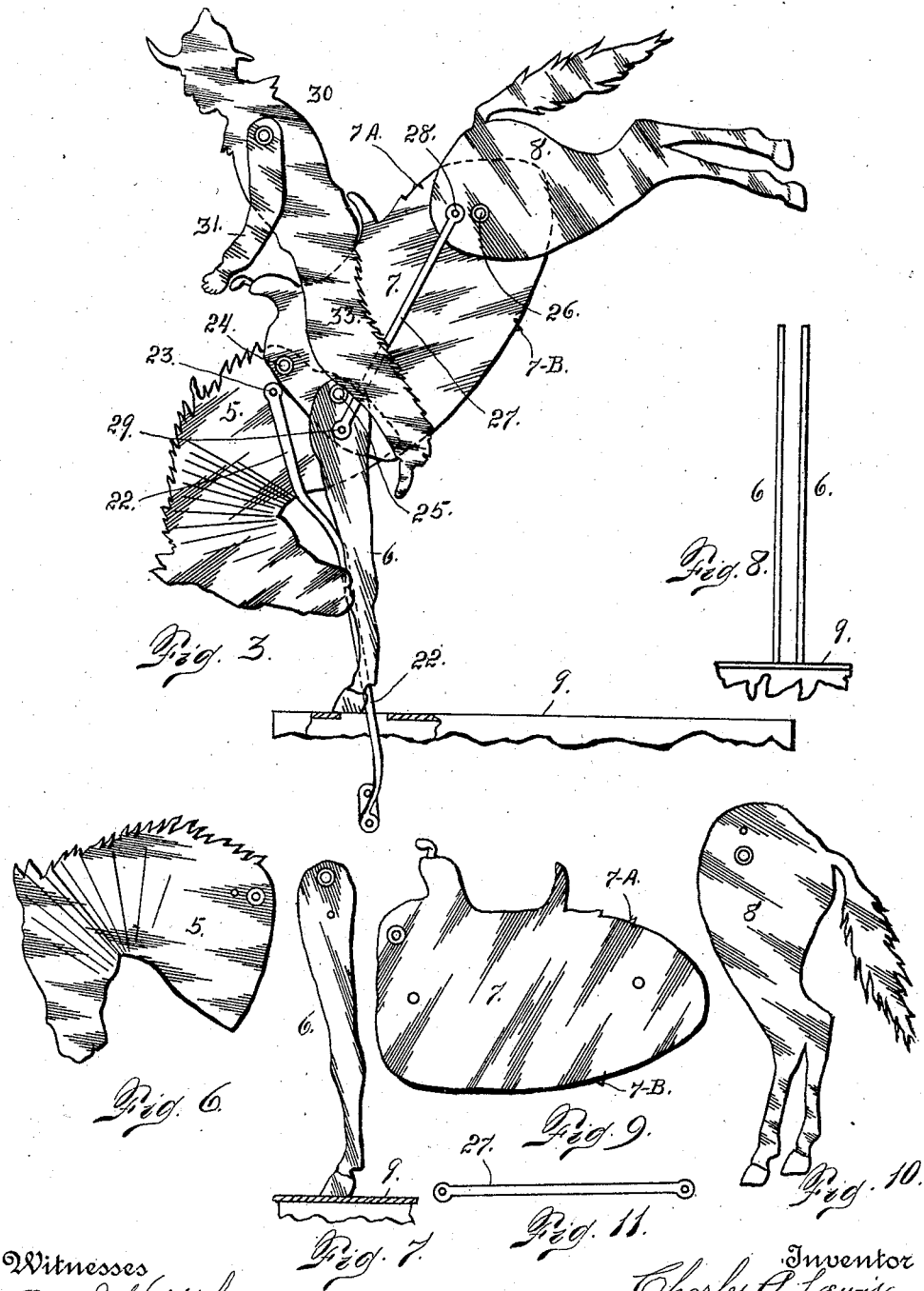

UNITED STATES PATENT OFFICE.

CHARLES A. LEWIS, OF DENVER, COLORADO.

MECHANICAL TOY.

No. 823,882.  Specification of Letters Patent.  Patented June 19, 1906.

Application filed February 23, 1906. Serial No. 302,369.

*To all whom it may concern:*

Be it known that I, CHARLES A. LEWIS, a citizen of the United States, residing in the city and county of Denver and State of Colorado, have invented certain new and useful Improvements in Mechanical Toys; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in mechanical toys.

My improved toy in the instance illustrated and herein specifically described is intended to illustrate a bronco-busting performance in which the animal and the rider perform, as nearly as may be, in the same manner as in actual life. The portion representing the animal is composed of a number of movable members so connected that as a spring-motor is set in motion a pitman connected therewith causes the animal to perform in bronco-busting fashion.

Having briefly outlined my improved device, as well as the function it is intended to perform, I will proceed to describe the same in detail, reference being made to the accompanying drawings, in which is illustrated an embodiment thereof.

In the drawings, Figure 1 is a side elevation of my improved mechanical toy, showing a motor-vehicle in section in order to disclose a portion of the mechanism within. Fig. 2 is an underneath view of the motor-vehicle. Fig. 3 is an elevation with the motor-vehicle partly broken away and showing the performing portion of the toy in a different position from that shown in Fig. 1. Fig. 4 is a front view of the representation of the rider. Fig. 5 is a side elevation of the same. Figs. 6, 7, 8, 9, and 10 illustrate in detail the various parts of which the performing animal is composed. These parts are in side elevation, except in Fig. 8, which may be called a "front" view of Fig. 7. Fig. 11 is a detail view of a link connecting two parts or members of the animal part of the toy.

The same reference characters indicate the same parts in all the views.

The animal portion of the toy, as shown in the drawings, consists of the head and neck part 5, the front legs 6, body part 7, and the rear part 8. The lower extremities of the legs 6 are secured to the top of the platform 9, which is mounted upon front wheels 10 and rear wheels 12. The forward axle 13 of the motor-vehicle is actuated by a motor-shaft 14, which is directly operated from a spring 15. This motor-shaft may have a key 16 connected therewith for winding the spring. The forward axle of the vehicle is operated from a motor-shaft by a suitable train of gears, (designated 17, 18, 19, and 20, respectively.) In this forward axle is formed a crank 21, with which is connected one extremity of a pitman 22, whose opposite extremity is pivotally connected with the member 5 of the animal, as shown at 23. The member 5 is pivotally connected with the body member 7, as shown at 24. The member 7 is also pivotally connected with the forward leg members 6, as shown at 25, while the rear portion of the body member is pivotally connected with the rear member 8, as shown at 26. The rear member 8 is connected with the member 6 by means of a link 27. The points where the extremities of the link are connected with the respective members are designated 28 and 29, respectively. The points where the various parts of the members 5, 6, 7, and 8 are connected with each other are different from the points where the pitman and link are connected. By virtue of this feature the various parts of the animal may be caused to make peculiar motions during the operation of the pitman which directly imparts movement only to the member 5 of the device.

If I assume that the crank 21 of a motor-vehicle is at its upward limit of movement and the mechanism be set in motion, the lower extremity of the pitman will move downwardly, drawing the member 5 of the animal to the position shown in Fig. 1, in which event the relation of the point 23, where the upper extremity of the pitman is connected, to the point 24, where the members 5 and 7 are pivotally connected together, is such that further downward movement of the pitman throws the body part 7 of the animal upwardly, the same turning on its pivot 25, connected with the stationary front leg member 6. During this movement of the body member the link 27, connecting the members 6 and 8, as aforesaid, acts to throw the rear member 8 outwardly, whereby it is given a different relative movement from the body part 7, thus producing a movement similar to that produced in actual life by an animal endeavoring to throw his rider. All these movements are performed during each rotation of the crank-shaft or the forward axle of the vehicle. The forward wheels 10 being made fast to the forward axle of the vehicle, the latter is propelled during the performance of the animal portion of the toy. In other words, after the motor-spring is wound, if the vehicle is placed upon a floor or other surface it will be actuated, and the animal performance will proceed simultaneously.

The animal portion of the device is preferably composed of sheet metal. This is also true of the rider member 30, which, as shown in the drawings, is provided with movable arms 31, pivoted to the body member, as shown at 32. The leg parts 33 are rigidly connected with the body member and separated to allow the rider member to be made to straddle the body member of the animal. The rider member is detachable, so that during the performance of the animal portion of the toy, as heretofore explained, the rider will sometimes be thrown from his position, thus adding to the amusement afforded by the toy.

Having thus described my invention, what I claim is—

1. A mechanical toy comprising an animal member consisting of a number of parts pivotally connected together, one of said parts being relatively stationary and the others movable, a motor, a pitman connecting one movable part of the animal portion of the toy with the motor, whereby movement is imparted directly to the said part and indirectly to another part, and a link connection between the stationary part and one of the movable parts.

2. A toy of the class described, comprising an animal portion composed of a head and neck member, a body member, a relatively stationary front leg member and a rear member, the head and neck member being pivotally connected with the body member, the rear member being pivotally connected with the body member, and the body member being pivotally connected with the stationary front leg member, an operating-pitman connected with the head and neck member, and a link connection between the front leg member and the rear member, the points of connection of the link and pitman being different from the pivotal points where the members of the animal are connected for the purpose set forth.

3. A mechanical toy comprising the representation of an animal consisting of a head and neck member, a body member pivotally connected with the head and neck member, a relatively stationary front leg member also pivotally connected with the body member, a rear member pivotally connected with the body member, an operating-pitman connected with the head and neck member, and a link connection between the front leg member and the rear member for the purpose set forth.

4. A toy of the class described, comprising a vehicle, a spring-motor mounted thereon, an animal device comprising various members pivotally connected together, an operating-pitman leading from the motor to one of the said members, a link connection between two other members, and a rider device detachably connected with the animal device.

5. A mechanical toy comprising the representation of an animal consisting of a relatively stationary member, a number of movable members, a motor, a pitman connecting one of the movable members with the motor, and a link connecting another movable member with the stationary member.

In testimony whereof I affix my signature in presence of two witnesses.

CHARLES A. LEWIS.

Witnesses:
DENA NELSON,
OTTO E. HODDICK.